US005604868A

United States Patent [19]
Komine et al.

[11] Patent Number: 5,604,868
[45] Date of Patent: Feb. 18, 1997

[54] COMMUNICATION SYSTEM USING ESTABLISHING NETWORK ROUTE

[75] Inventors: Hiroaki Komine, Yamato; Takafumi Chujo, Hachioji; Keiji Miyazaki; Takao Ogura, both of Kawasaki, all of Japan; Tetsuo Soejima, San Jose, Calif.

[73] Assignee: Fujitsu Limited, Japan

[21] Appl. No.: 720,916

[22] Filed: Jun. 25, 1991

[30] Foreign Application Priority Data

Jun. 27, 1990 [JP] Japan ..................................... 2-168760

[51] Int. Cl.⁶ .......................... G06F 13/14; H04L 12/56; H04L 5/14
[52] U.S. Cl. .............................. 395/200.15; 395/200.12; 370/400; 340/825.03
[58] Field of Search ..................................... 340/827, 826, 340/825.03, 825.02, 825.8; 370/60, 94.1, 60.1; 395/200.11, 200.12, 200.14, 200.15

[56] References Cited

U.S. PATENT DOCUMENTS

| | | | |
|---|---|---|---|
| 3,155,775 | 11/1964 | Zarouni | 340/827 |
| 4,399,531 | 8/1983 | Grande et al. | 370/60 |
| 4,873,517 | 10/1989 | Baratz et al. | 340/827 |
| 4,912,656 | 3/1990 | Cain et al. | 340/827 |
| 4,914,571 | 4/1990 | Baratz et al. | 364/200 |
| 4,920,529 | 4/1990 | Sasaki et al. | 370/16 |
| 4,939,728 | 7/1990 | Markkula, Jr. et al. | 370/60 |
| 4,956,835 | 9/1990 | Grover | 370/16 |
| 5,101,451 | 3/1992 | Ash et al. | 340/827 |
| 5,245,607 | 9/1993 | Caram | 370/94.1 |
| 5,282,270 | 1/1994 | Oppenheimer et al. | 395/200.11 |
| 5,452,303 | 9/1995 | Shimuzu | 370/94.1 |

FOREIGN PATENT DOCUMENTS 2022733  2/1991  Canada .

OTHER PUBLICATIONS

Publication entitled "Computer Network Architectures and Protocols," pp. 340 and 341 (Paul E. Green, Jr.) Plenum Press, New York, 1982.

*Computer Communication Review*, Performance Models For Noahnet, Gurudatta M. Parulkar, et al., Aug. 18, 1988, pp. 262–273, No. 4.

*IEE Proceedings*, Fibre–Optic Local–Area Network With Arbitrary Topology, H. K. Punk, B. Sc., et al., Apr. 1984, pp. 77–82, No. 2.

*IEEE Infocom*, The Conference on Computer Communications, Raphael Rom, Aug. 1989, pp. 910–917, Technion–Israel Institute of Technology.

*A Stimulation Study of Arbnet*, A Flood Routing Local Area Network, H. K. Pung and Michael Lim, 1900, pp. 245–261, IFIP 1990.

Primary Examiner—Alpesh M. Shah
Assistant Examiner—Mark H. Rinehart
Attorney, Agent, or Firm—Greer, Burns & Crain, Ltd.

[57] ABSTRACT

A communication system using a network route establishing technique for a network having a plurality of nodes connected through links, in which a route search message is delivered simultaneously in a plurality of directions from a sender node through a network route to a destination node, and a confirmation is delivered from the destination through the network route back to the sender node, and accordingly, a network route is established. The communication system includes a device for detecting, at a node through which a search message is to be transmitted, a possibility of a transmission of the search message beyond the node, a device for delivering a cancel message in the direction from which the search message has been transmitted, and a device for releasing the network route engaged by the search message, based on the delivered cancel message.

12 Claims, 19 Drawing Sheets

COMMUNICATION SYSTEM USING ESTABLISHING NETWORK ROUTE

BACKGROUND OF THE INVENTION

1. Field of the Invention

The present invention relates to a communication system using a technique of establishing a network route. The system according to the present invention can be used for a network having a plurality of nodes connected through links and used in a telephone communication or a data communication system.

2. Description of the Related Arts

In general, a network is constituted by a plurality of nodes connected to each other through a plurality of links, communicatable terminal devices connected to the nodes, and a center station connected to the nodes through control links. The state of each of the nodes or the links is monitored by the center station, and the most suitable network route is established based on the results of the monitoring.

As one method of establishing a network route by exchanging messages between two nodes, and distributing the processings of the search for a detour route to the nodes in a network, where a failure occurs in the network, a flooding technique is used. In the flooding technique, information is transmitted simultaneously in a plurality of directions.

In the above-described system using a center station which monitors the state of each of the nodes and the links, the control signals are concentrated at the center station, and thus, in a complicated network having a large capacity, the length of time required for establishing a route is increased, which causes a problem in such a system.

In the system using the flooding technique, problems arise in that it is difficult to deal with a situation wherein a failure occurs in a node or failures occur in a plurality of links.

SUMMARY OF THE INVENTION

Accordingly, an object of the present invention is to provide an improved communication system using a network route establishing technique in which the control processes are distributed to the nodes, to thereby avoid a concentration of same at a center station, an engaged but unused route is released by a cancel message, so that the route is quickly established, and thus the utilization efficiency of the network is enhanced.

Another object of the present invention is to provide an improved communication system using a network route establishing technique in which the processes in response to a plurality of simultaneous requirements for an establishment of routes can be carried out satisfactorily.

In accordance with the present invention, there is provided a communication system using a network route establishing technique for a network having a plurality of nodes connected through links, in which a route search message is delivered simultaneously in a plurality of directions from a sender node through a network route to a destination node, and a confirmation is delivered from the destination through the network route back to the sender node, and accordingly, the network route is established. This communication system includes a device for detecting, at a node through which a search message is to be transmitted, a possibility of the transmission of the search message beyond the node, a device for delivering a cancel message in the direction along which the search message has been transmitted, and a device for releasing the network route engaged by the search message based on the delivered cancel message.

In accordance with the present invention there is also provided a communication system using a network route establishing technique for a network having a plurality of nodes connected through links, in which a route search message is delivered simultaneously in a plurality of directions from a sender node through a route to a destination node, and a confirmation message is delivered from the destination node through the route back to the sender node, and accordingly, a network route is established. This communication system includes a device for holding in a node a search message which arrives at the node later than a previously transmitted message, and delivering the search message held in the node from the node, based on an establishing or release of a route established by the previously transmitted message.

DESCRIPTION OF THE PREFERRED EMBODIMENTS

Figure 1:
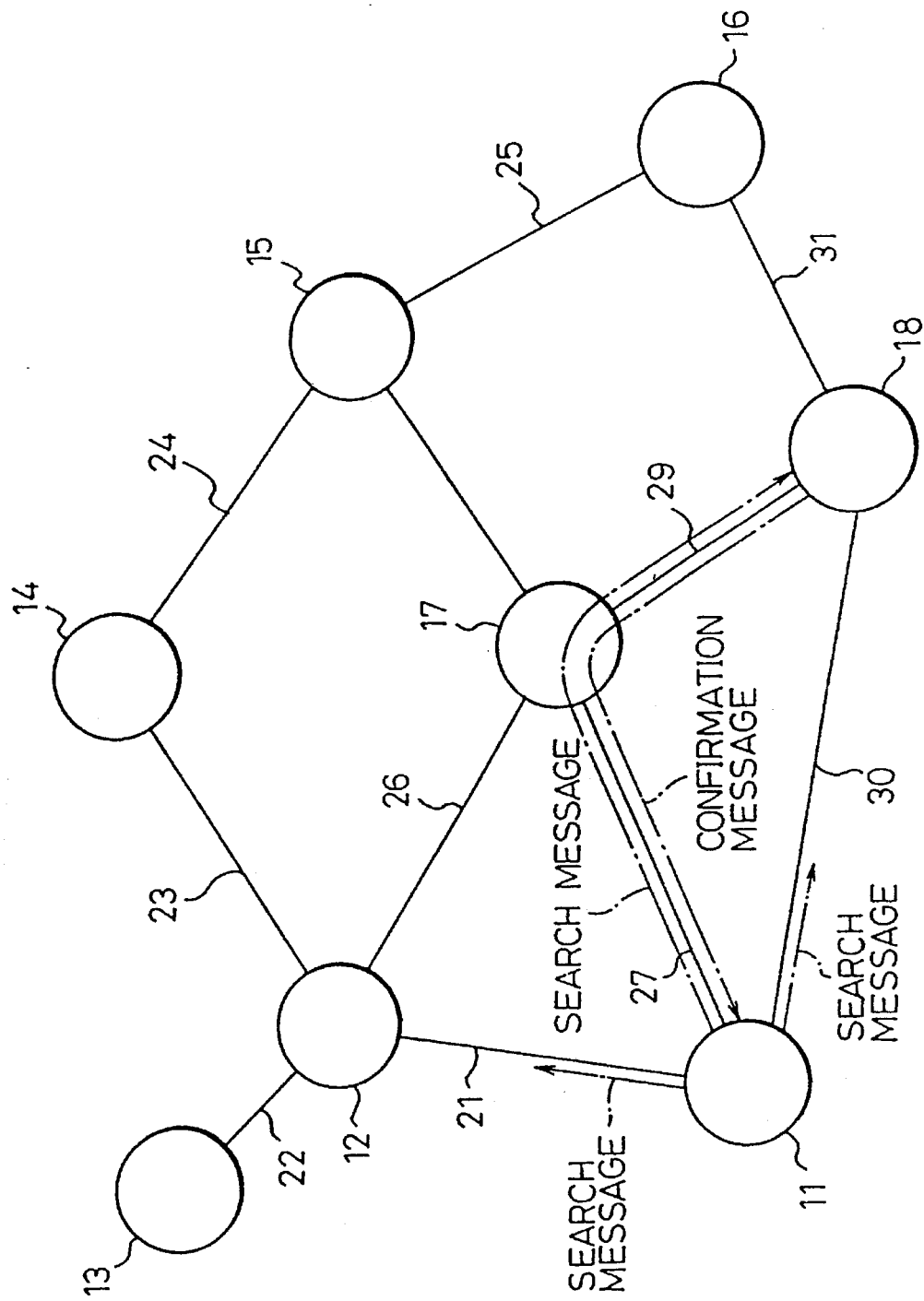
FIG. 1 illustrates a delivery of a search message and a return of a confirmation message, as in a prior art.

Before describing the preferred embodiments of the present invention, the operations of a delivery of a search message and a return of a confirmation message in a prior art system will be explained with reference to FIG. 1. As shown in FIG. 1, the network is constituted by a plurality of nodes 11, 12, 13, 14, 15, 16, 17, and 18, and a plurality of links 21, 22, 23, 24, 25, 26, 27, 28, 29, 30, and 31 by which the concerned nodes are connected, respectively.

In the network shown in FIG. 1, search messages are delivered from, for example, node 11, in a plurality of directions simultaneously to reach a destination node, for example, the node 18. Upon receiving the search message, the destination node 18 returns a confirmation message to the node 11, and consequently, a network route from the node 11, through a link 27, a node 17, and a link 29 to the node 18, is established.

Figure 2:
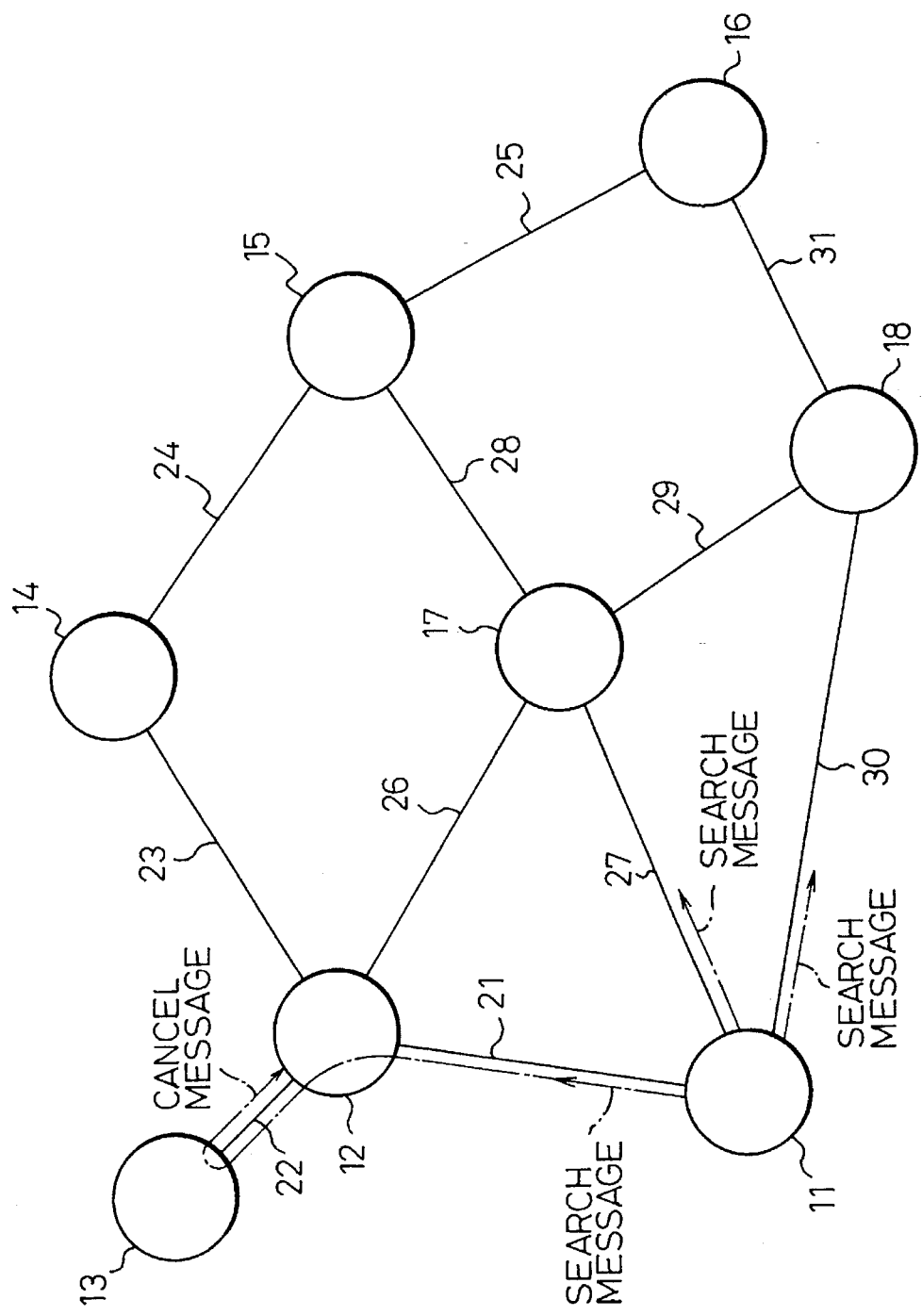
FIG. 2 shows a communication system according to an embodiment of the present invention.

A communication system using a network route establishing technique according to an embodiment of the present invention is shown in FIG. 2. The network to which the communication system using the network route establishing technique of FIG. 2 is applied is constituted by a plurality of nodes 11 to 18, and a plurality of links 21 to 31 by which the concerned nodes are connected, respectively.

In the system of FIG. 2, one of the search messages delivered from the node 11 is propagated through a link 21, a node 12, and a link 22 toward the node 13.

In the system of FIG. 2, with regard to the node 13, if the search message reaching the node 13 cannot be further propagated beyond the node 13, a cancel message is sent back from the node 13, and the network route engaged by the search message is cancelled by the returned cancel message.

Figure 3:
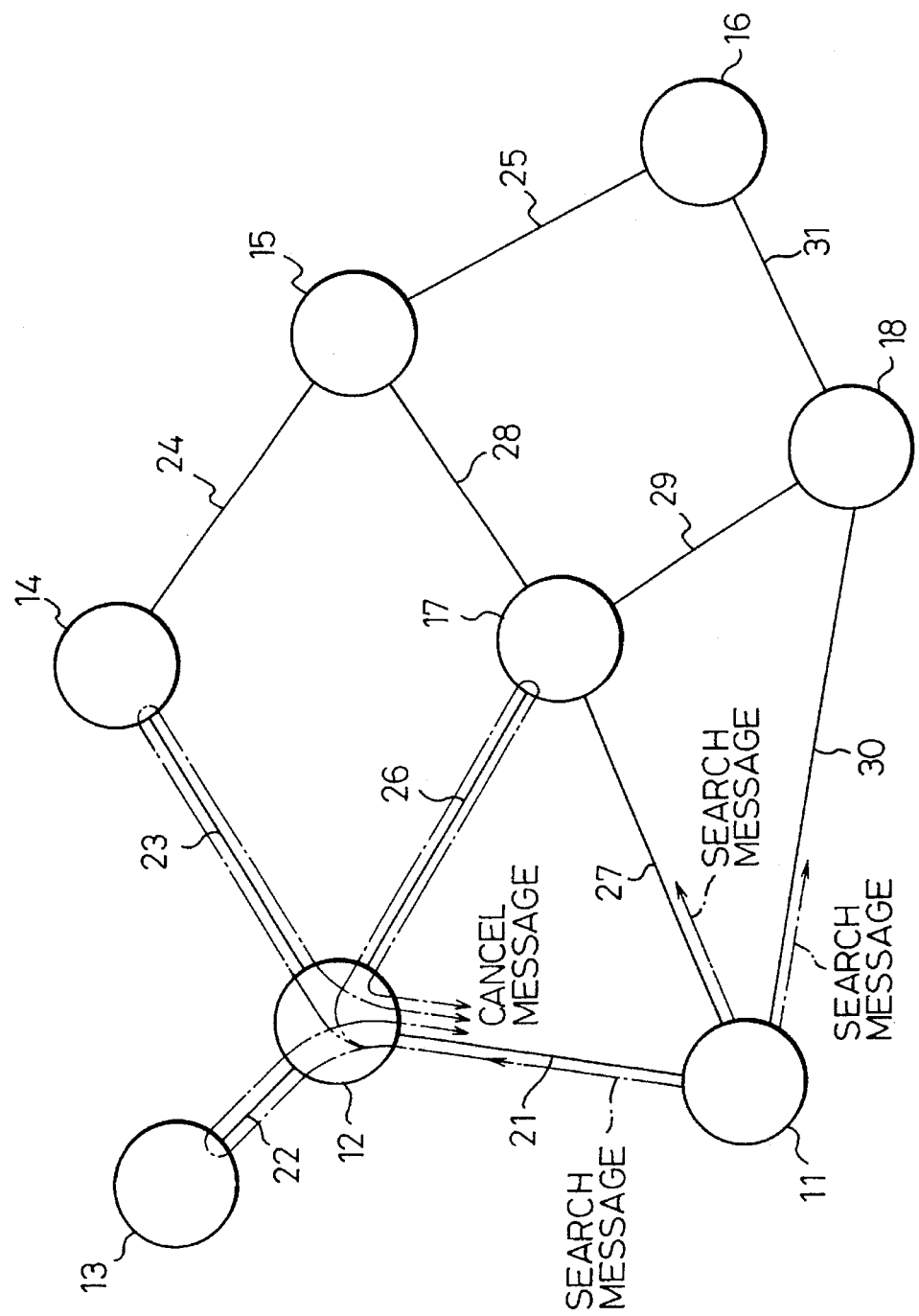
FIGS. 3 to 6 show communication systems according to four other embodiments of the present invention, respectively.

A communication system according to another embodiment of the present invention is shown in FIG. 3. The network to which the communication system of FIG. 3 is applied is the same as in the case of FIG. 2.

In the system of FIG. 3, with regard to the node 12, if all of the cancel messages are returned to the node 12 through all of the links through which the search messages are delivered, a cancel message is delivered from the node 12 in the direction from which the search message has been received.

Figure 4:
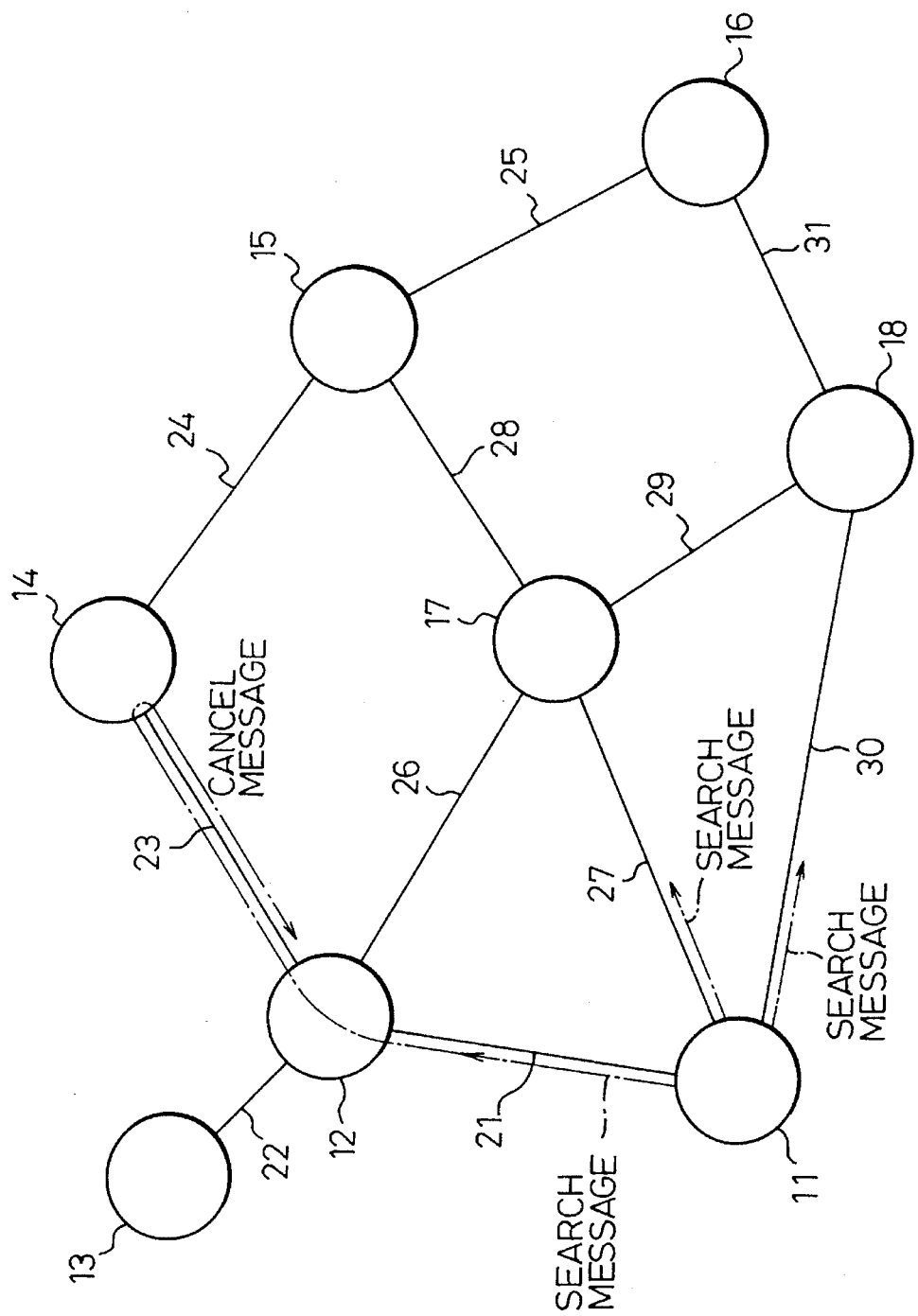

A communication system according to another embodiment of the present invention is shown in FIG. 4. The network to which the communication system of FIG. 4 is applied is the same as in the case of FIG. 2.

In the system of FIG. 4, with regard to the node 14, if a vacant line does not become available at the node 14, a cancel message is delivered in the direction from which the search message has been transmitted, and the route engaged by the search message is released by this cancel message.

Figure 5:
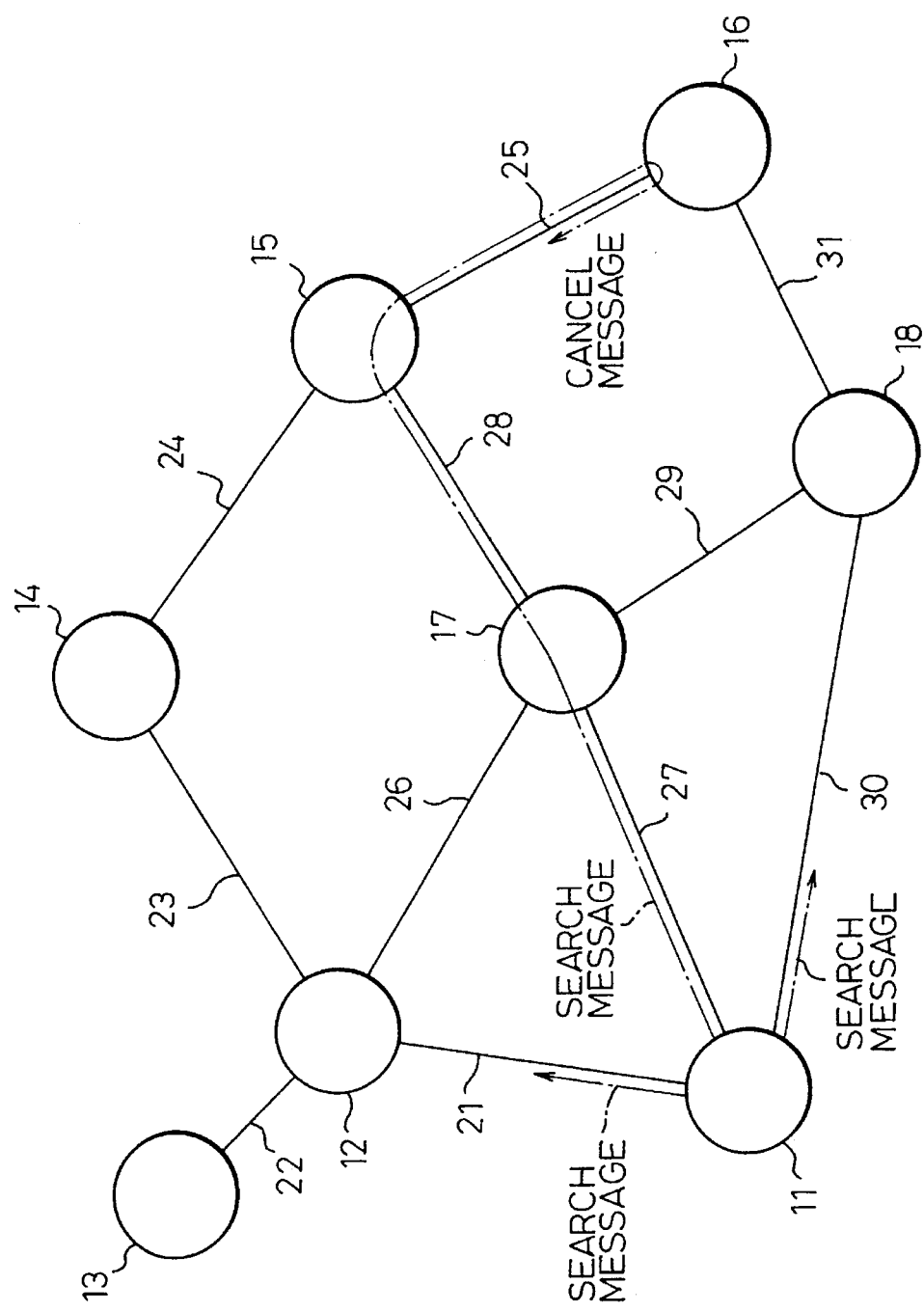

A communication system according to another embodiment of the present invention is shown in FIG. 5. The network to which the communication system of FIG. 5 is applied is the same as in the case of FIG. 2.

In the system of FIG. 5, with regard to the node 16, if the number of nodes through which the search message has been transmitted becomes more than a predetermined number of nodes, a cancel message is delivered in the direction from which the search message has been transmitted, and the route engaged by the search message is released by this cancel message.

In the system of FIG. 5, it is possible to vary the above-mentioned predetermined number of nodes.

Figure 6:
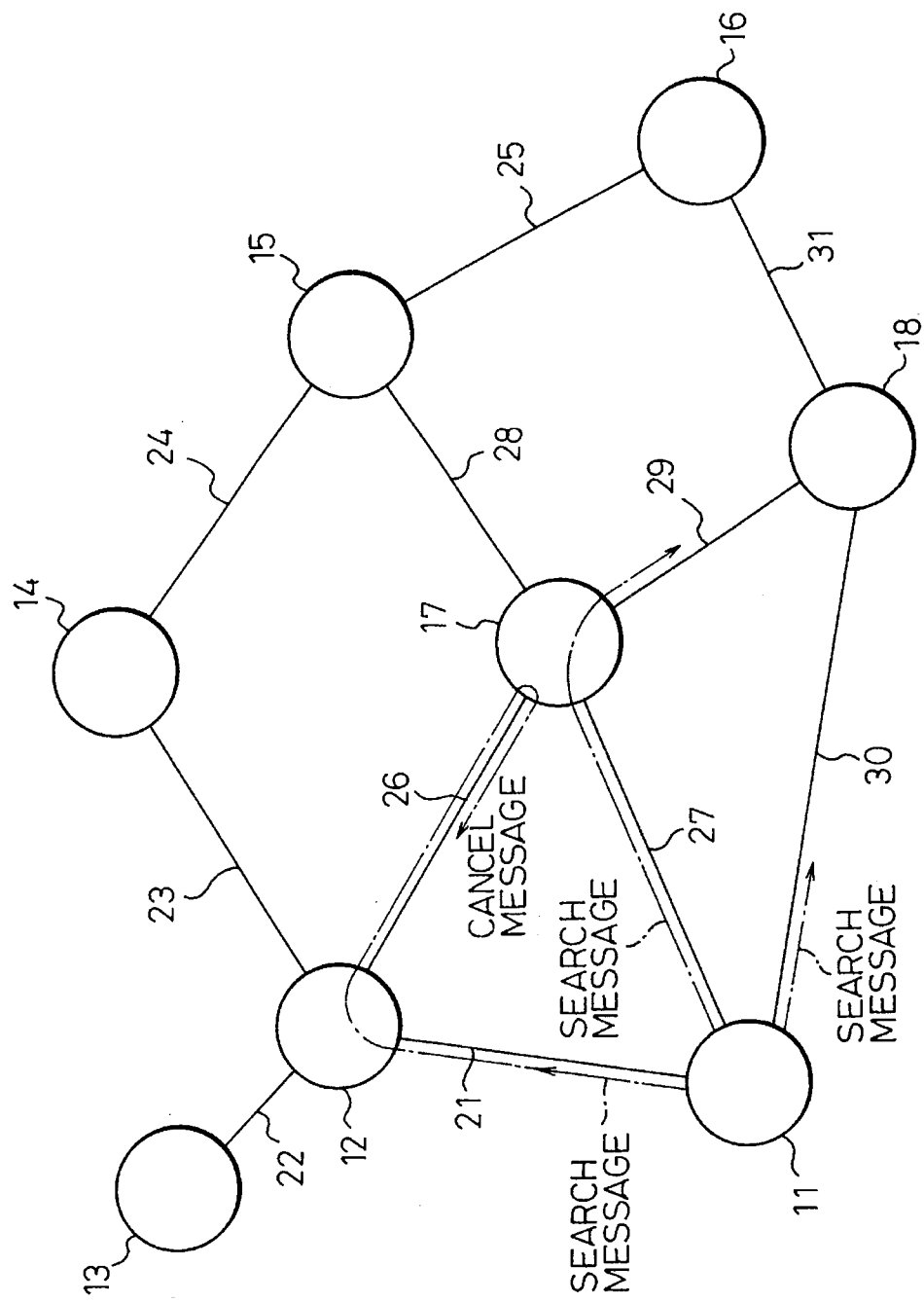

A communication system according to another embodiment of the present invention is shown in FIG. 6. The network to which the communication system of FIG. 6 is applied is the same as in the case of FIG. 2.

In the system of FIG. 6, with regard to the node 17, if the same search message has already arrived through a different route, a cancel message is delivered in the direction from which the search message has been transmitted, and the route engaged by the search message is released by this cancel message.

Figure 7:
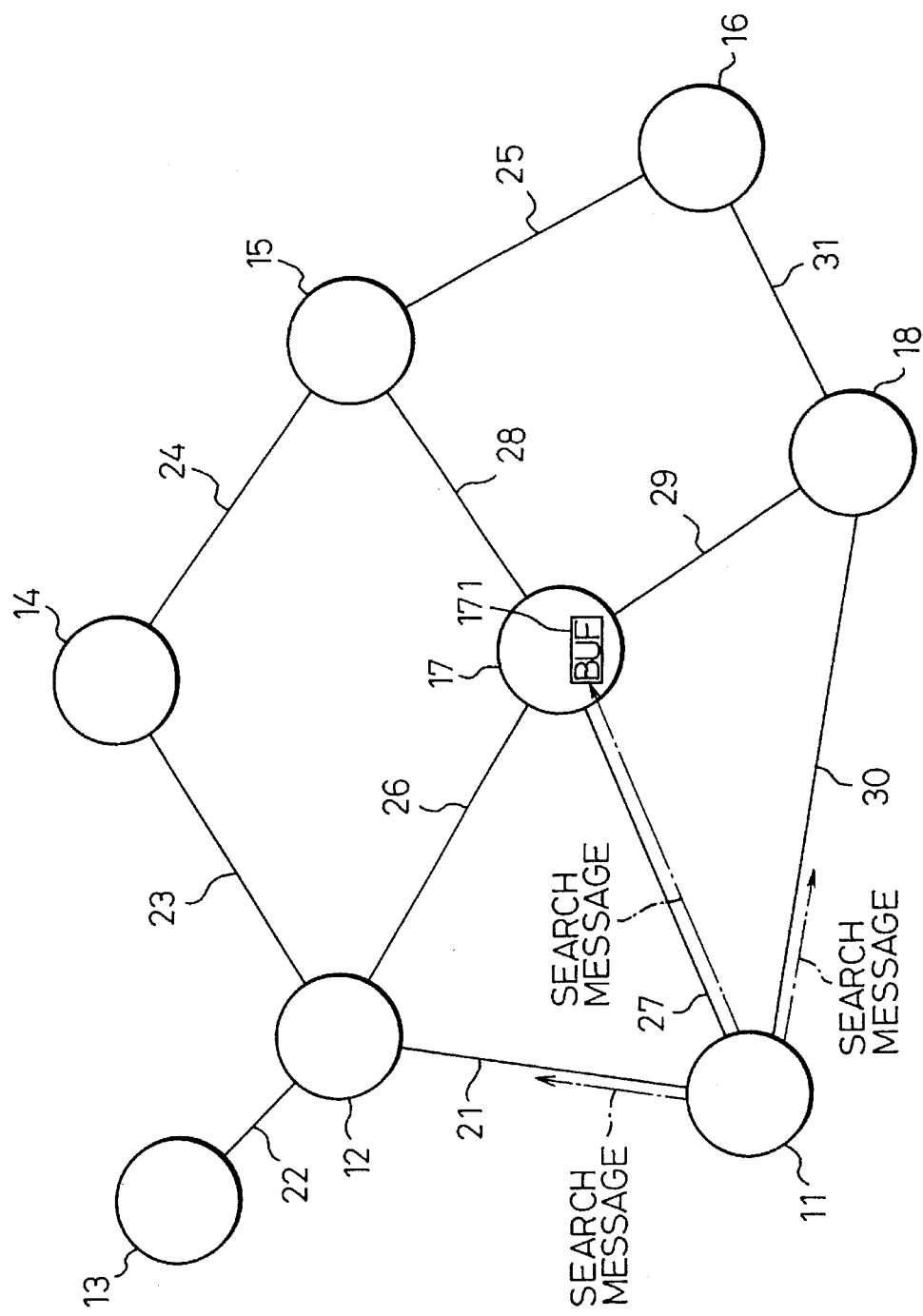
FIGS. 7 to 10 show communication systems according to four other embodiments of the present invention, respectively.

A communication system according to another embodiment of the present invention is shown in FIG. 7. The network to which the communication system of FIG. 7 is applied is the same as in the case of FIG. 2.

In the system of FIG. 7, with regard to the node 17, if a search message through a different route has passed by the node 17, a subsequently arrived search message is held in the node 17. When an establishing or a release of a route to be secured by the previously transmitted search message is carried out, the search message held in the node 17 is read from the node 17, and the read search message is delivered.

Figure 8:
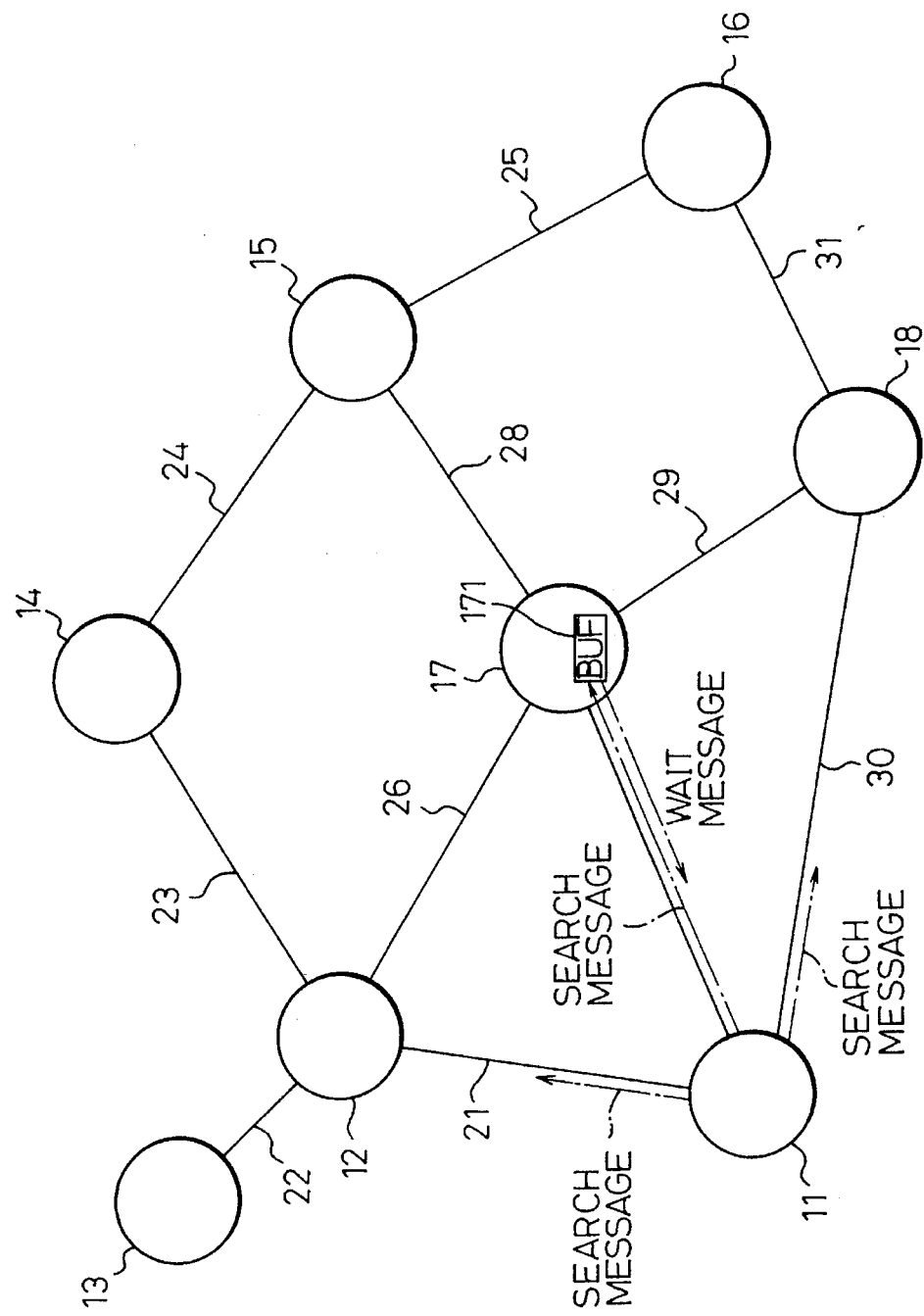

A communication system according to another embodiment of the present invention is shown in FIG. 8. The network to which the communication system of FIG. 8 is applied is the same as in the case of FIG. 2.

In the system of FIG. 8, with regard to the node 17, if the search message delivered through a different route has passed by the node 17, a subsequently arrived search message is held in the node 17 in the waiting state, and this waiting state of the held search message is informed to the node 11 from which the held search message has been transmitted.

Figure 9:
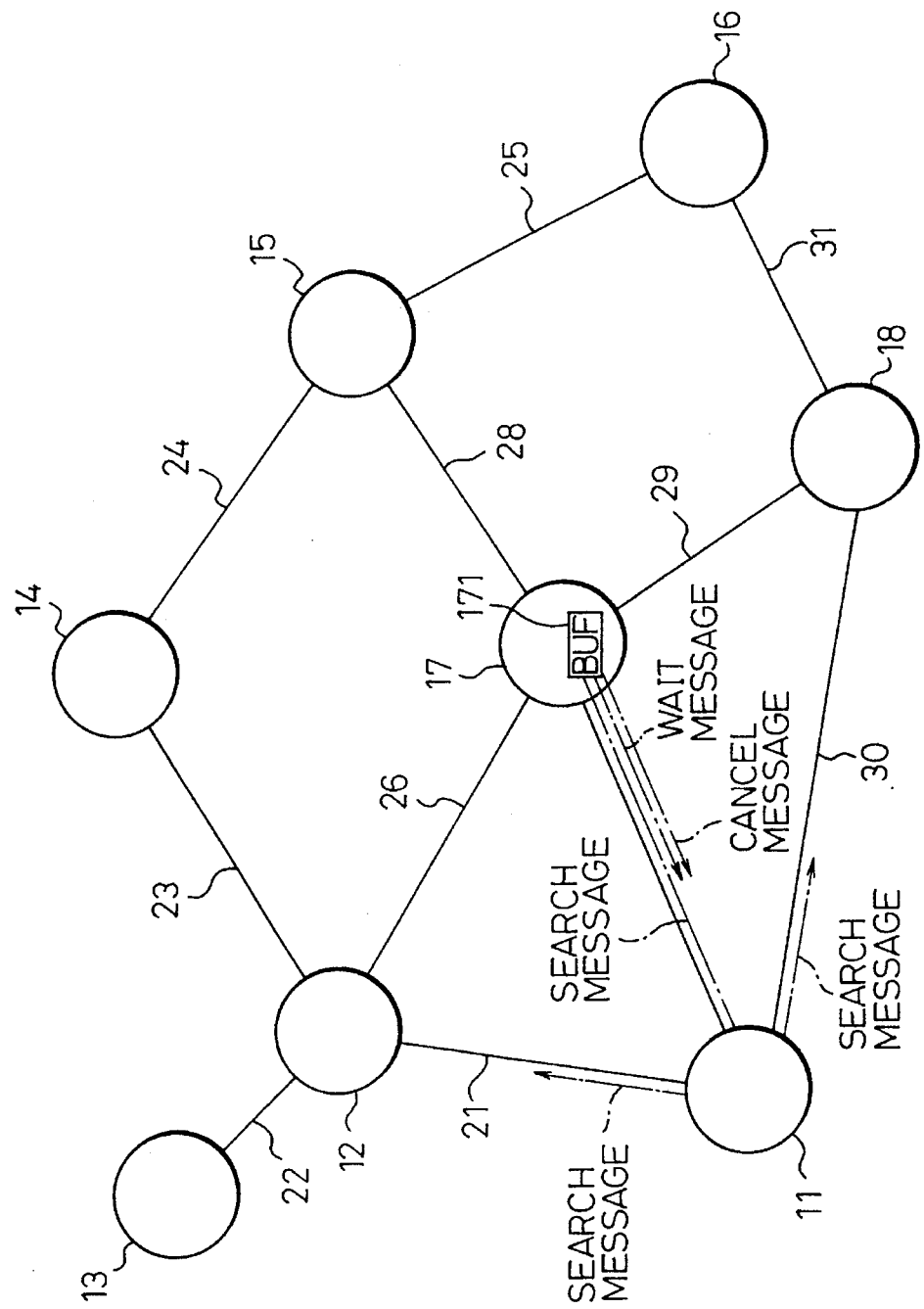

A communication system according to another embodiment of the present invention is shown in FIG. 9. The network to which the communication system of FIG. 9 is applied is the same as in the case of FIG. 2.

In the system of FIG. 9, with regard to the node 17, if the search message delivered through a different route has passed by the node 17, the length of time for which a subsequently arrived search message is held in the node 17 is limited to a preselected length of time, and upon an expiration of the preselected time, the subsequently arrived search message is cancelled.

In the system of FIG. 9, the measurement of the elapsed time can be carried out either in the node 17 in which the search message is held or in the node 11 in which the detection of a failure is carried out.

Figure 10:
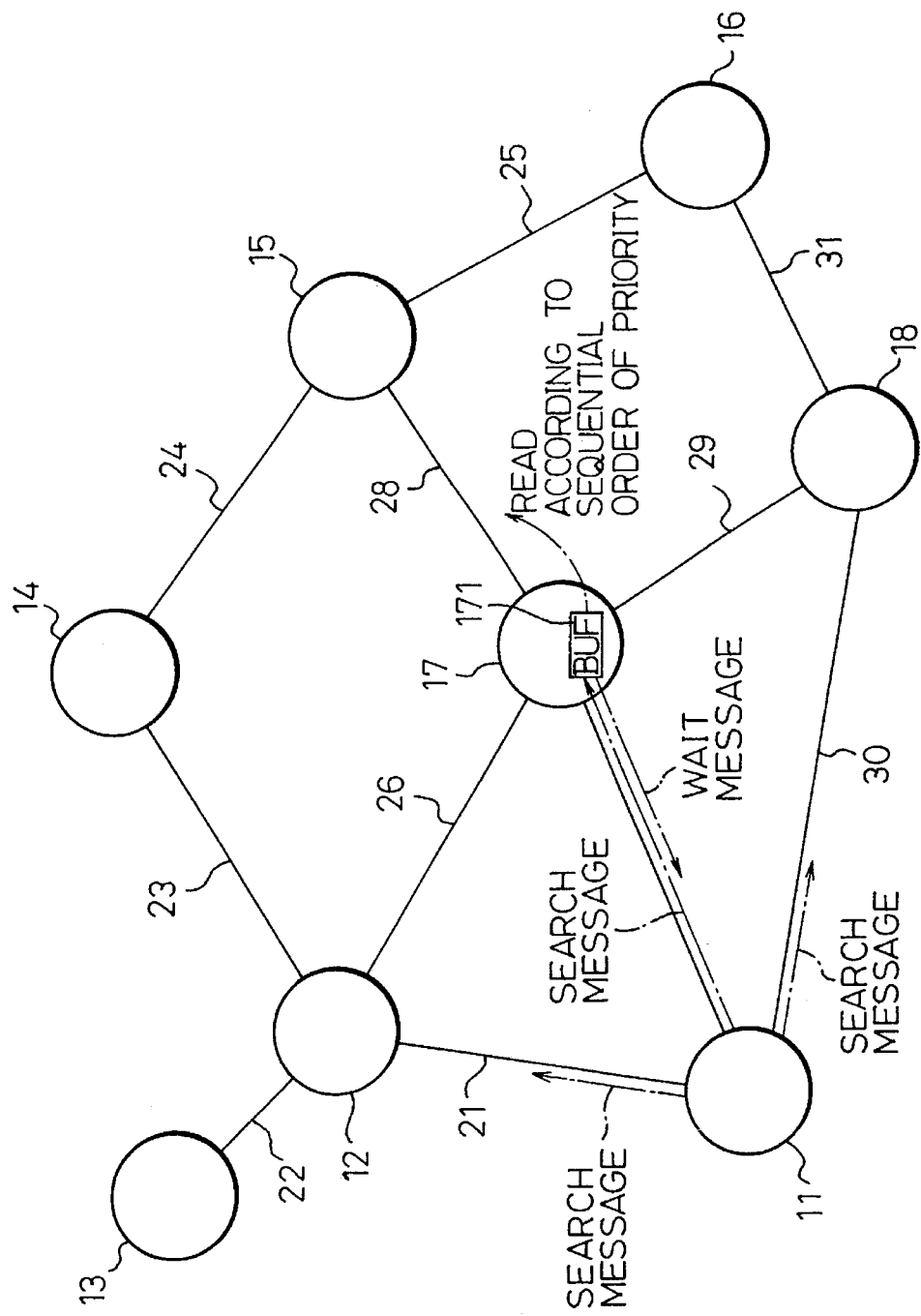

A communication system according to another embodiment of the present invention is shown in FIG. 10. The network to which the communication system of FIG. 10 is applied is the same as in the case of FIG. 2.

In the system of FIG. 10, with regard to the node 17, the delivery of search messages held in node 17 is carried out in sequence in accordance with the sequence of the order of priority thereof.

Figure 11:
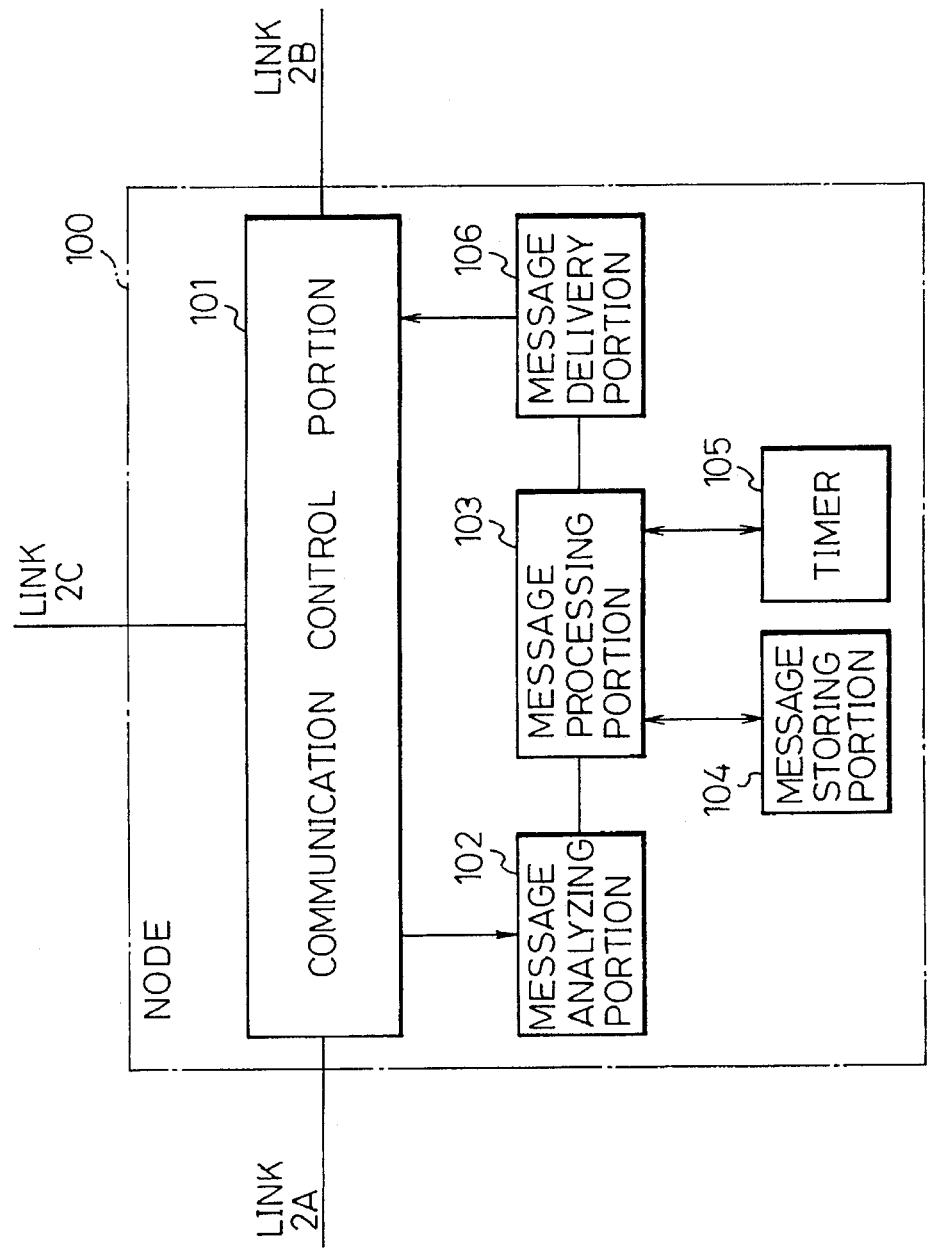
FIG. 11 shows an example of the structure of a node in the communication system according to the embodiments of the present invention.

An example of the structure of a node in the communication system according to the embodiments of the present invention is shown in FIG. 11. The node 100 corresponds to the nodes 11 to 18 in FIGS. 2 to 10. As shown in FIG. 11, a node 100 is constituted by a communication control portion 101, a message analyzing portion 102, a message processing portion 103, a message storing portion 104, a timer 105, and a message delivery portion 106.

The control portion 101 controls the communications between the node 100 and the other nodes through links 2A, 2B and 2C, and carries out the extraction of messages from the other nodes and the insertion of messages to the other nodes. The messages from the other nodes include search messages and cancel messages, and the messages to the other nodes include confirmation messages, cancel messages, and wait messages.

In the message analyzing portion 102, an analysis is made of the messages from the other nodes extracted by the communication control portion 101. In the message processing portion 103, predetermined various processings of the messages analyzed in the message analyzing portion 102 are carried out. The message storing portion 104, for example, a buffer storage, can store a plurality of messages, and exchange messages with the message processing portion 103. The timer 105 measures the time for which a message is held in the message storing portion or the time elapsed from a delivery of a message. The message delivery portion 106 delivers a message from the message processing portion 103 to the communication control portion 101.

The operation of the node 100 of FIG. 11 will be explained in relation to the communication systems shown in FIGS. 2 to 10 according to embodiments of the present invention.

As in the case of FIG. 2, with regard to the node 13, when the search message from the node 11 cannot be transmitted beyond the node 13, a cancel message is delivered through the message processing portion 103 and the message delivery portion 106 in the direction from which the search message has been received, and the route engaged by the search message is released by the cancel message.

As in the case of FIG. 3, with regard to the node 12, when the node 12 receives all of the cancel messages through all of the links through which the search messages have been delivered, a cancel message is delivered from node 12 in the direction from which the search message to node 12 has been transmitted. The cancel message is supplied through the message analyzing portion 102 to the message processing portion 103, and when the message processing portion 103 determines that all of the cancel messages are received through all of the links, a cancel message is delivered through the message delivery portion 106 in the direction from which the search message has been transmitted.

As in the case of FIG. 4, with regard to the node 14, when a vacant line is not available at the node 14 through which the search message is to be transmitted, a cancel message is delivered through the message delivery portion 106 in the direction from which the search message has been transmitted, and the route which has been engaged by the search message is released by the cancel message.

As in the case of FIG. 5, with regard to the node 16, when the number of nodes 17, 15, and 16 through which the search message has passed, i.e., hop number, becomes more than a predetermined number at node 16, a cancel message is delivered from node 16 in the direction from which the search message has been transmitted, and the route engaged by the search message is released by the cancel message.

In the message processing portion 103, the number of nodes through which the search message has been transmitted is compared with a predetermined number, and when the number of nodes through which the search message has been transmitted becomes more than a predetermined number, the cancel message is delivered through the message processing portion 103 and the message delivery portion 106 in the direction from which the search message has been transmitted, and the route engaged by the search message is released.

Note, the above-mentioned predetermined number can be made variable.

As in the case of FIG. 6, with regard to the node 17, when the same search message, i.e., the message having the same identifier (ID), has already reached the node 17, a cancel message is delivered in the direction from which the search message in question has been transmitted, and the route engaged by the search message in question is released by the cancel message.

In the message processing portion 103, it is decided whether or not the same search message has already reached its destination, based on the identifier information, and when the decision is affirmative, a cancel message is delivered through the message processing portion 103 and the message delivery portion 106 in the direction from which the search message in question was transmitted, and the route engaged by the search message in question is released.

As in the case of FIG. 7, with regard to the node 17, if the search message transmitted through a different route has already passed through node 17, the search messages subsequently arriving at the node 17 are successively held by being stored in the message storing portion 104. When an establishment or release of the route engaged by the search message which has been transmitted is carried out, the message stored in the message storing portion 104 is delivered through the message processing portion 103 and the message delivery portion 106.

As in the case of FIG. 8, with regard to the node 17, if the search message transmitted through a different route has already passed through the node 17, a search message subsequently arriving there is held by being stored in the message storing portion 104, and at the same time, a wait message indicating the waiting state is delivered through the message processing portion 103 and the message delivery portion 106 to the node 11 from which the search message in question has been transmitted.

As in the case of FIG. 9, with regard to the node 17, if the search message transmitted through a different route has already passed through the node 17, the length of time for which it is stored in the message storing portion 104 is limited to a predetermined time length, and when this predetermined time length has elapsed, a message subsequently arriving there is cancelled by the operation of the message processing portion 103.

The measurement of the elapse of time is carried out either in the node 17 in which the search message is stored or in the node 11 in which a failure is detected. The information in the timer 105 is used for the measurement of the elapse of time.

As in the case of FIG. 10, with regard to the node 17, the search messages stored in the message storing portion 104 and the delivery of the read search message are read in the sequence of the priority thereof. It is also possible to carry out the reading and the delivery in accordance with the arrival sequence.

A flow chart of an example of the processing of the search message in the system according to the embodiments of the present invention is shown in FIGS. 12A to 12E.

Figure 12A:
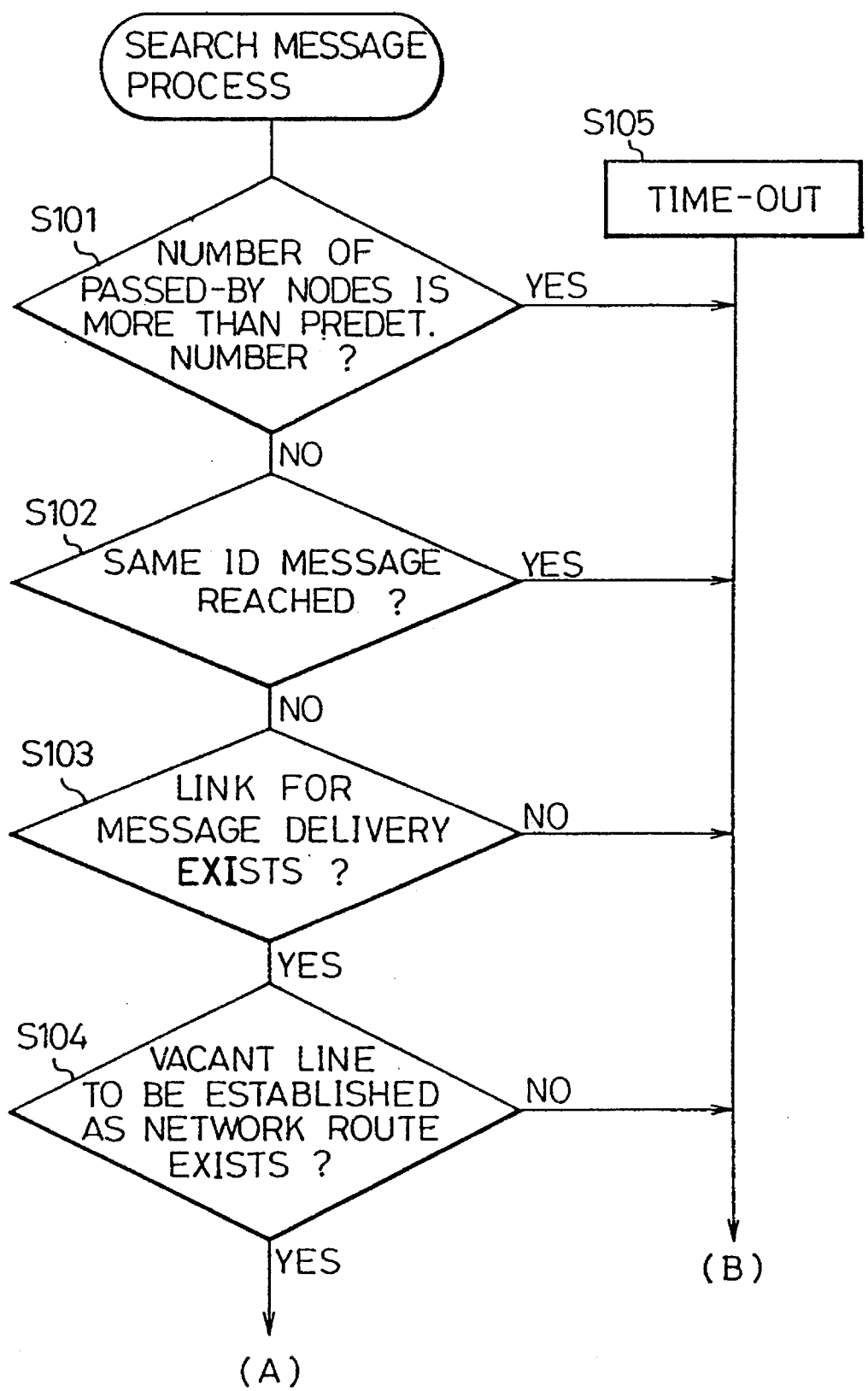
FIGS. 12A to 12E show an example of a flow chart of the processing of the search message in the system according to the embodiments of the present invention.

With regard to the flow chart of FIG. 12A, a decision on whether or not the number of the passed-by nodes is more than a predetermined number (S101), a decision on whether or not the same identifier message has reached (S102) its destination, a decision on whether or not a link through which the search message can be delivered exists (S103), a decision on whether or not a vacant line which can be established as a network route exists (S104), and a determination of an occurrence of time-out (S105) are carried out.

Figure 12B:
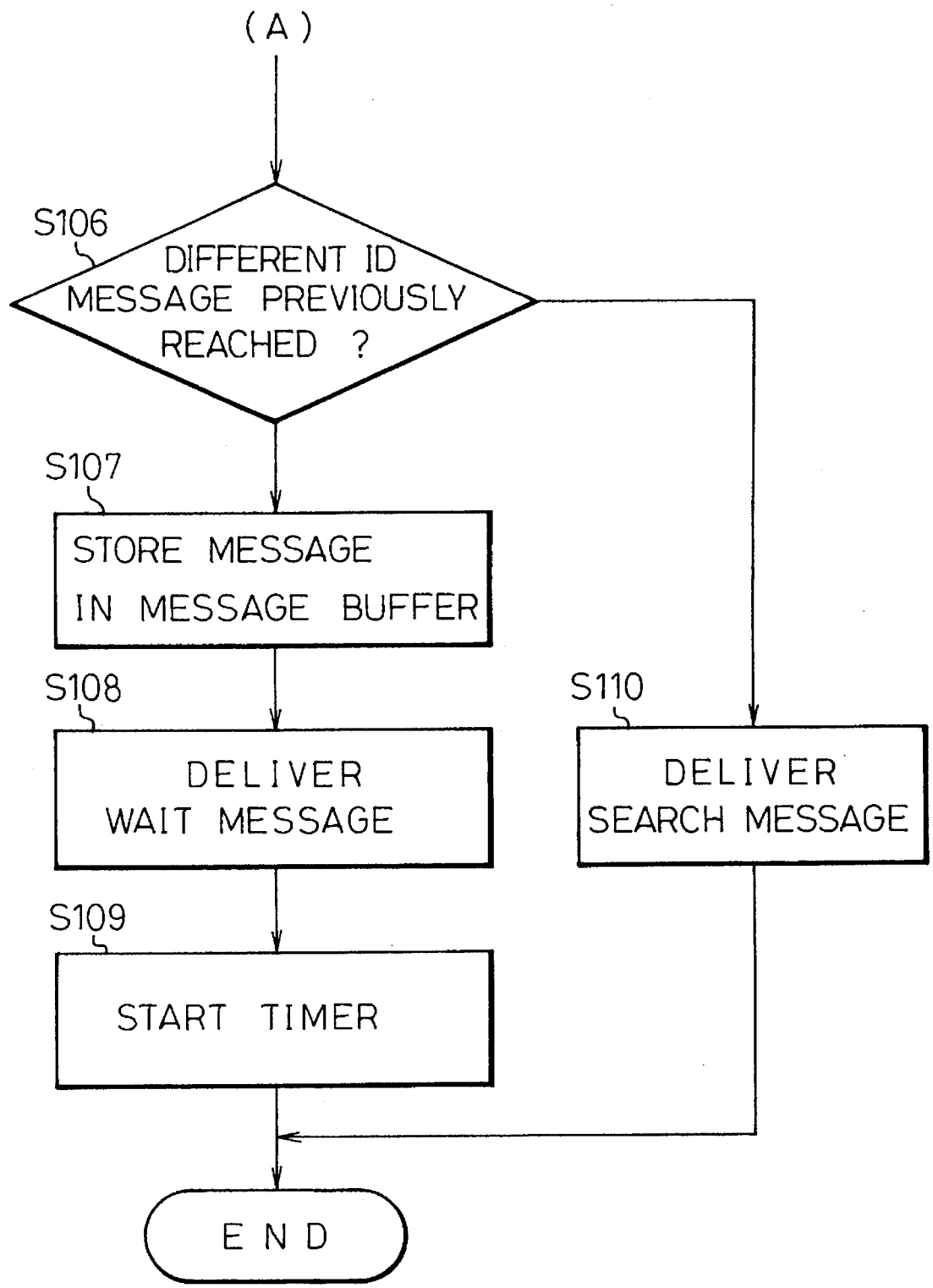

With regard to the flow chart of FIG. 12B, a decision on whether or not a message having different identifier has reached (S106) its destination, a step of storing the message in the message buffer (S107), a process for delivering a wait message (S108), a step for starting the timer (S109), and a step for delivering the search message (S110) are carried out.

Figure 12C:
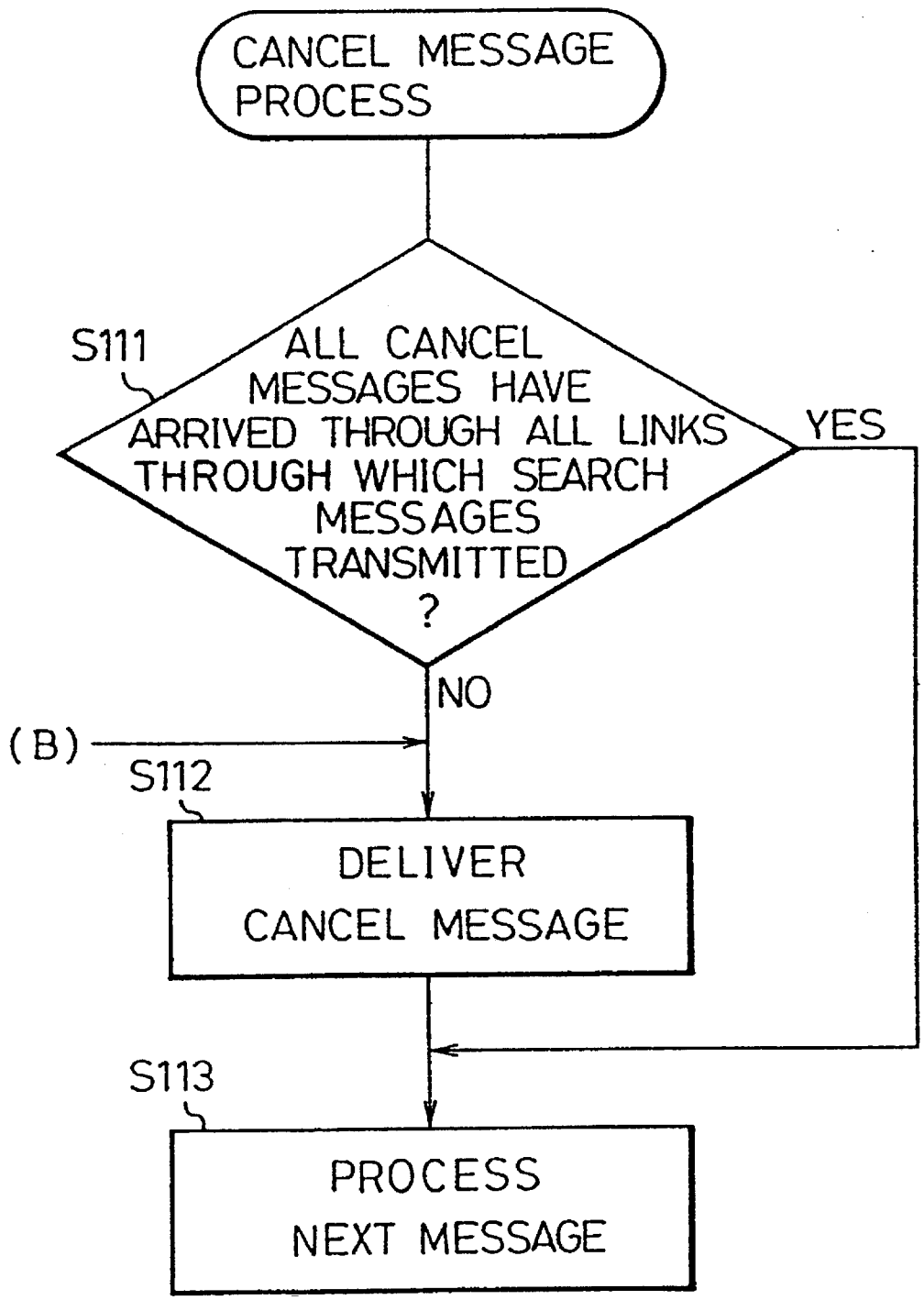

With regard to the flow chart of FIG. 12C, a decision on whether or not all of the cancel messages have arrived through all of the links through which the search messages have transmitted (S111), a step for delivering a cancel message (S112), and a step for processing the next message (S113) are carried out.

Figure 12E:
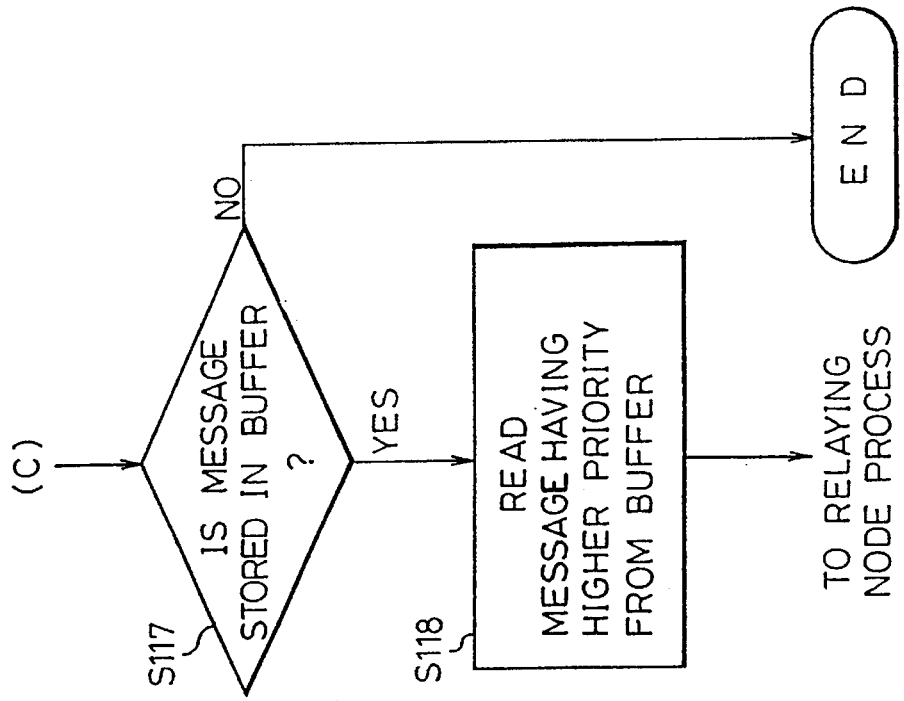
Figure 12D:
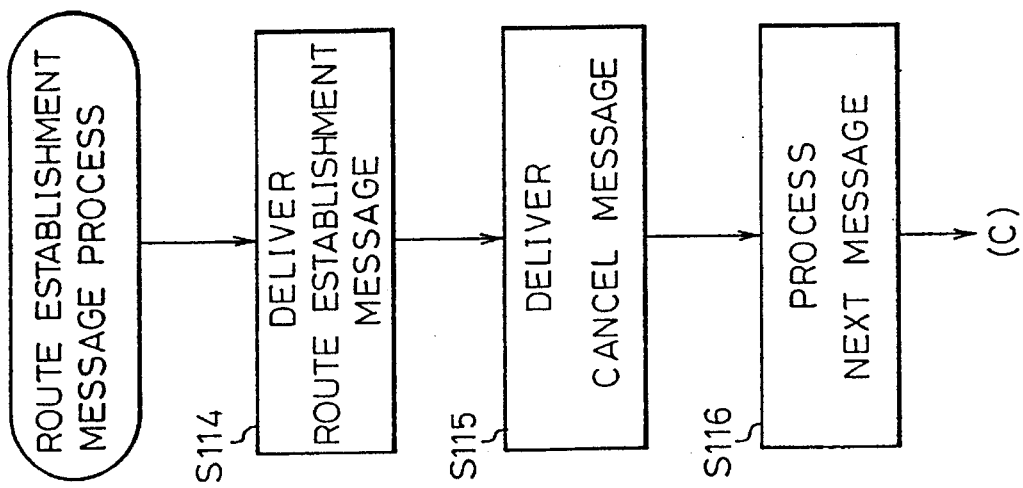

With regard to the flow chart of FIG. 12D, a step for delivering a route establishing message (S114), a step for delivering a cancel message (S115), and a step for processing the next message (S116) are carried out.

With regard to the flow chart of FIG. 12E, a decision on whether or not a message is stored in the buffer storage (S117), and a step for reading a message having a higher priority from the buffer storage (S118), are carried out.

Figure 13:
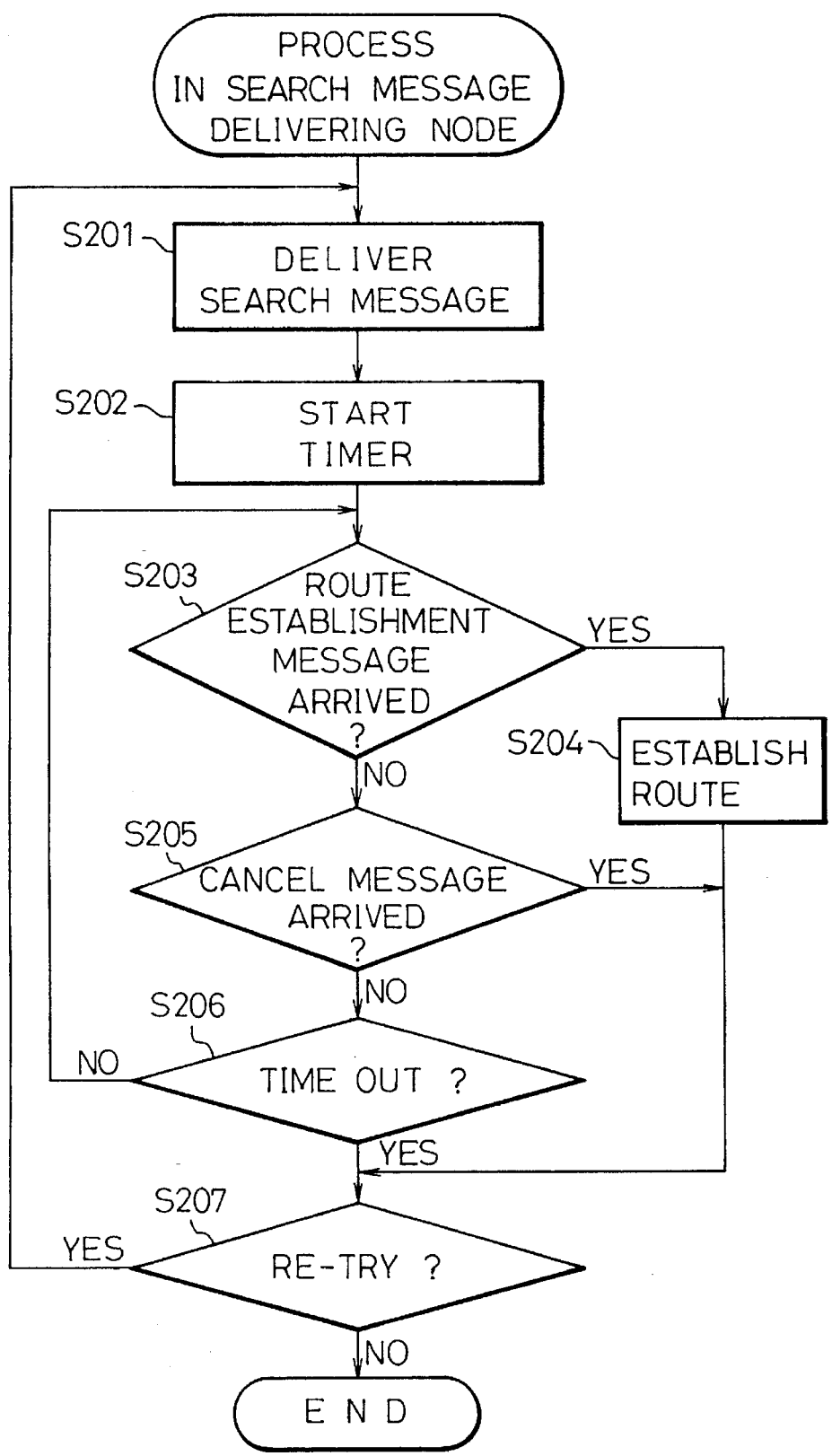
FIG. 13 shows an example of a flow chart of the processing in a node which delivers a search message.
Figure 14:
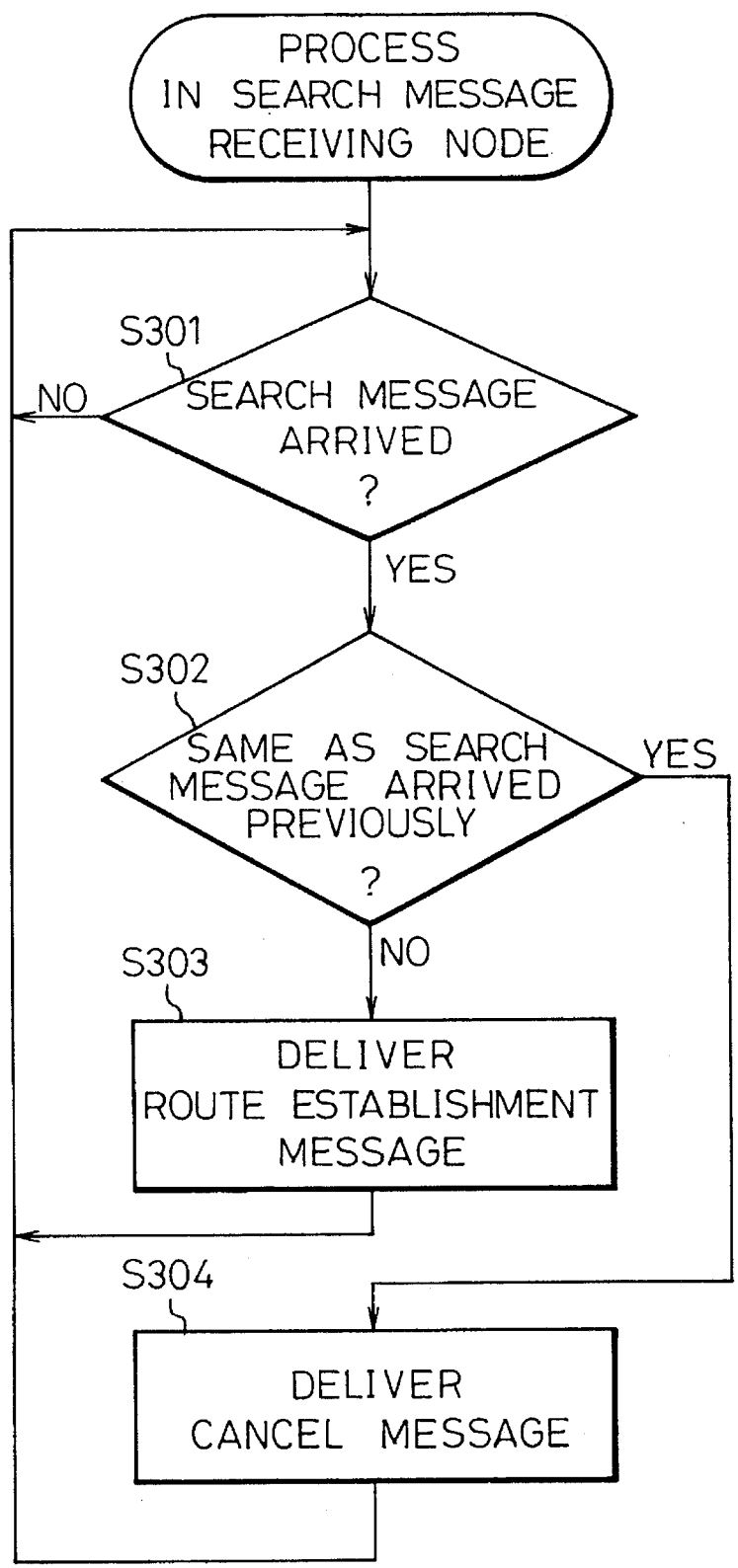
FIG. 14 shows an example of a flow chart of the processing in a node which receives a search message.
Figure 15:
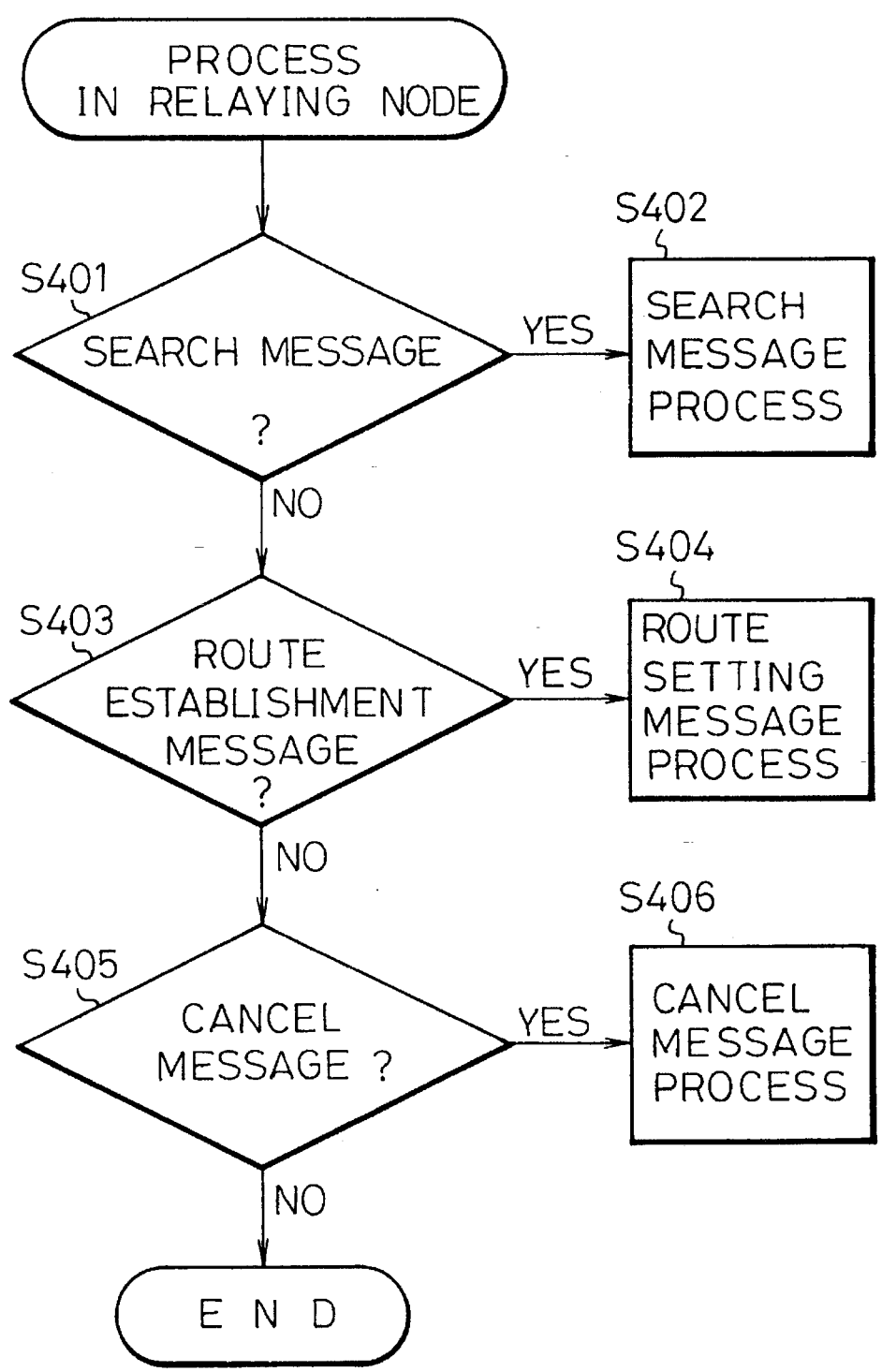
FIG. 15 shows an example of a flow chart of the processing in a node which relays a search message.

The examples of the flow charts of the processes in a node which delivers a search message, in a node which receives a search message, and in a node which carries out a relaying of a search message, are shown in FIGS. 13, 14, and 15, respectively.

With regard to the flow chart of FIG. 13, a step for delivering a search message (S201), a step for starting the timer (S202), a decision on whether or not a route establishing message has arrived (S203), a step for establishing a route (S204), a decision on whether or not a cancel message has arrived (S205), a decision on whether or not a time out has occurred (S206), and a decision on whether or not a re-try is to be made (S207), are carried out.

With regard to the flow chart of FIG. 14, a decision on whether or not a search message has arrived (S301), a decision on whether or not the arrived search message is the same as the previously arrived search message (S302), a step for deliver a route establishing message (S303), and a step for delivering a cancel message (S304), are carried out.

With regard to the flow chart of FIG. 15, a decision on whether or not the message is a search message (S401), a step for processing the search message (S402), a decision on whether or not the message is a route establishing message (S403), a step for processing the route establishing message (S404), a decision on whether or not the message is a cancel message (S405), and a step for processing the cancel message (S406), are carried out.

Figure 16:
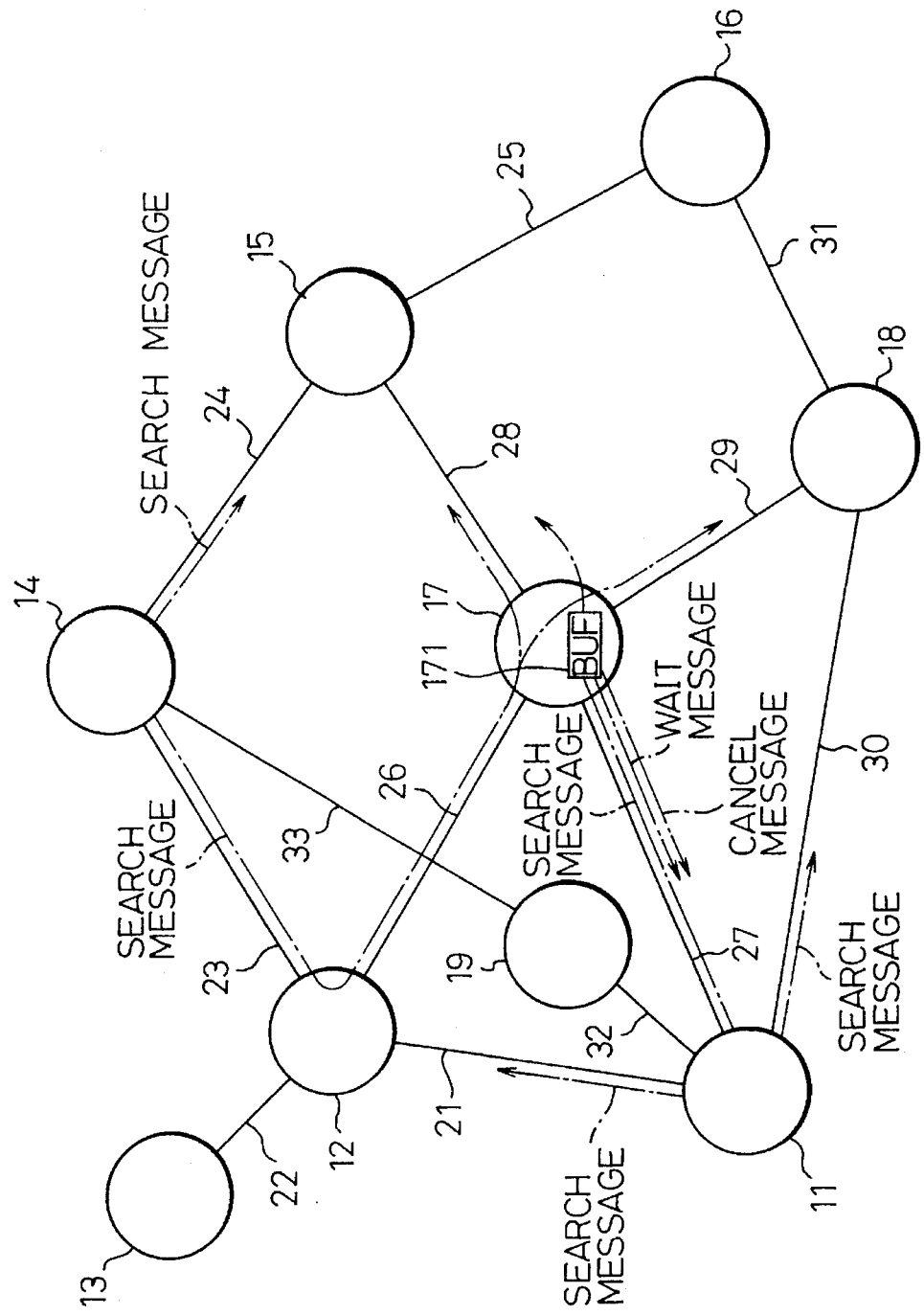
FIG. 16 shows a communication system according to still another embodiment of the present invention.

A communication system according to still another embodiment of the present invention is shown in FIG. 16. In the system of FIG. 16, it is assumed that a failure has occurred in the node 19.

In response to the occurrence of the failure in the node 19, first search messages are delivered from the node 11, simultaneously and in a plurality of directions, and second search messages are delivered from the node 14, also simultaneously and in a plurality of directions.

With regard to the node 17, if a second search message has been passed-by when a first search message arrives at the node 17, this first search message is stored in a buffer storage 171 in the node 17.

After the establishing or the release of a route engaged by the previously passed second search message, the first message stored in the buffer storage 171 is read from the buffer storage 171, and the read first message is delivered from the node 17.

The information of the storage state of the first search message in the node 17 is transmitted as a wait message, from the node 17 to the node 11.

The length of time for which the first search message is stored in buffer storage 171 is limited to a predetermined time length, and when this predetermined time length has expired, a cancel message is transmitted from the node 17 to the node 11 and the first search message is cancelled by this cancel message. The measurement of the elapse of time with regard to the predetermined time length can be carried out in the node 17, node 11, or node 14. With regard to the reading of the search messages stored in buffer storage 171 in the node 17 and the delivery of the read search message, it is possible to read the search messages in accordance with the priority sequence or the arrival sequence at the node 17.

We claim:

1. A communications system comprising:

a plurality of nodes; and a plurality of lines connecting said nodes, wherein each node of said plurality of nodes includes, communication control means for controlling communications between said node and other nodes among said plurality of nodes, said communication control means including detecting means for detecting, in response to a search message received from one node of said other nodes, if said search message can be transmitted to another of said other nodes, said detecting means including means to determine, whether the search message has already passed through a predetermined number of nodes, and, whether a vacant line from among said plurality of lines exists for transmitting the search message to another node;

message delivery means, connected to said communication control means, for delivering a cancel message to said one node when said detecting means detects that either said search message has already passed through said predetermined number of nodes or that a vacant line does not exist;

release means, within said communication control means, for releasing said node from said one node upon delivery of a cancel message by said message delivery means.

2. A system according to claim 14 wherein each of said nodes includes means for receiving cancel messages through all links along which search messages have been delivered from said node, and means for delivering cancel messages from said node in the directions from which said search messages are received.

3. A system according to claim 1, wherein each of said nodes includes means for delivering a cancel message and means for releasing the route engaged by said search message.

4. A system according to claim 1 wherein each of said nodes includes means for transmitting a search message through a number of nodes, means for delivering a cancel message from said node when the number of nodes through which said search message is transmitted becomes more than a predetermined number at one node, and means for releasing the route engaged by said search message.

5. A system according to claim 4 wherein said predetermined number is made variable.

6. A system according to claim 1, wherein each of said nodes includes means for transmitting a search message through a number of nodes, means for detecting that the same message has already arrived through another route at a node, means for delivering a cancel message from said node, and means for releasing the route engaged by said search message;

said system further comprising means for delivering a cancel message from a node at which a detection of an impossibility of a further transmission of a search message is carried out, and based on a said cancel message, releasing a route engaged by said search message.

7. A communications system comprising:

a plurality of nodes; and a plurality of lines connecting said nodes, wherein each node of said plurality of nodes includes, communication control means for controlling communications between said node and other nodes among said plurality of nodes, said communication control means receiving search messages from said other nodes and establishing or releasing routes formed between said node and said other nodes in response to a search message received from one of said other nodes, said communication control means including means to determine if a route can be established by determining, whether the search message has already passed through a predetermined number of nodes, and whether a vacant line from among said plurality of lines exists for transmitting the search message to another node;

message storing means for storing a search message received from a first one of said other nodes when a search message has previously been received from a second one of said other nodes; and message delivery means, connected to said communication control means, for delivering said search message stored by said storing means in response to said establishing or releasing of routes.

8. A system according to claim 7, wherein each of said nodes includes means for detecting that a preceding search message has already been transmitted through a different route, means for holding a search message arriving at said node later than said preceding search message in said node, and means for sending a notification of the state of the holding of said later arrived search message in said node to a sender node from which said later arrived search message has been delivered.

9. A system according to claim 7, wherein each of said nodes includes means for detecting that a preceding search message has already been transmitted through a different route, means for setting a preselected time limit for holding a later arrived search message in said node, and means for cancelling said later arrived search message upon the expiration of said preselected limit time.

10. A system according to claim 9, wherein each of said nodes includes means for measuring an elapse of time at a node in which said later arrived search message is held.

11. A system according to claim 9, wherein each of said nodes includes means for measuring of an elapse of time at a node where a fault is detected.

12. A system according to claim 7, wherein each of said nodes includes means for detecting that a preceding search message has already been transmitted through a different route, means for successively holding search messages arriving at said node later than said preceding search message, means for determining when the route engaged by the preceding search message is established or released, and means for delivering search messages held in said node in accordance with a priority of a sequence of an arrival from said node.

* * * * *

UNITED STATES PATENT AND TRADEMARK OFFICE
CERTIFICATE OF CORRECTION

PATENT NO. : 5,604,868
DATED : Feb. 18, 1997
INVENTOR(S) : Komine et al.

It is certified that error appears in the above-indentified patent and that said Letters Patent is hereby corrected as shown below:

Column 8, line 26, delete "14" and insert --1--.

Signed and Sealed this

Twenty-first Day of October 1997

Attest:

BRUCE LEHMAN

Attesting Officer

Commissioner of Patents and Trademarks